United States Patent
Adinarayan et al.

(10) Patent No.: US 10,212,279 B1
(45) Date of Patent: *Feb. 19, 2019

(54) IDENTIFYING AND CONTROLLING UNWANTED CALLS

(71) Applicant: INTERNATIONAL BUSINESS MACHINES CORPORATION, Armonk, NY (US)

(72) Inventors: Geetha Adinarayan, Bangalore (IN); Dinesh Radhakrishnan, Bangalore (IN); Akshat Dixit, Bangalore (IN); Gandhi Sivakumar, Bentleigh (AU)

(73) Assignee: International Business Machines Corporation, Armonk, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 15/837,074

(22) Filed: Dec. 11, 2017

Related U.S. Application Data

(63) Continuation of application No. 15/813,565, filed on Nov. 15, 2017.

(51) Int. Cl.
 *H04M 3/436* (2006.01)
 *G10L 25/63* (2013.01)
 (Continued)

(52) U.S. Cl.
 CPC ............ *H04M 3/436* (2013.01); *G10L 25/63* (2013.01); *H04M 1/274508* (2013.01);
 (Continued)

(58) Field of Classification Search
 None
 See application file for complete search history.

(56) References Cited

U.S. PATENT DOCUMENTS

| 6,370,235 B1 | 4/2002 | Heiner |
| 6,519,332 B1 | 2/2003 | Tovander |

(Continued)

OTHER PUBLICATIONS

Google Play; Call Blocker Free—Blacklist; retrieved from the Internet Nov. 13, 2017; URL: https://https://play.google.com/store/apps/details?id=com.netqin.mm&hl=en; 3 pages.

(Continued)

*Primary Examiner* — Antim G Shah
(74) *Attorney, Agent, or Firm* — Schmeiser, Olsen & Watts, LLP; Daniel Simek

(57) ABSTRACT

Systems, methods and tools for leveraging computer networks, data sharing, data analytics and sentiment analysis to control the receipt of unwanted telephone calls and preventing unwanted telephone calls from disturbing a user through the implementation of contacts list and/or a shared table of unique calls. Contact lists and shared tables of unique calls may identify incoming calls that may be directed to the user or filtered out based on whether the incoming call's number is in the user's contact list and/or based on the past experiences of the individual users engaging with the incoming caller. Embodiments may track the past call durations for unique incoming number and track the sentiment of users during these calls and use the collected call data and sentiment determine whether subsequent incoming calls from a phone number should be forwarded to the user's telephone enabled device or automatically responded to with further instructions.

6 Claims, 6 Drawing Sheets

(51) Int. Cl.
    *H04M 1/2745*    (2006.01)
    *H04N 1/32*      (2006.01)
(52) U.S. Cl.
    CPC ....... *H04N 1/3201* (2013.01); *H04N 1/32016*
                    (2013.01); *H04N 1/32021* (2013.01)

(56) References Cited

U.S. PATENT DOCUMENTS

| | | |
|---|---|---|
| 6,757,534 B2 | 6/2004 | Bach et al. |
| 9,160,846 B2 | 10/2015 | Daniel et al. |
| 2005/0064854 A1 | 3/2005 | Jang |
| 2010/0246795 A1* | 9/2010 | Saha ................ H04M 3/436 |
| | | 379/210.02 |
| 2016/0309023 A1 | 10/2016 | Sugimoto et al. |
| 2016/0360036 A1* | 12/2016 | Ansari ............. H04M 3/436 |
| 2017/0019534 A1* | 1/2017 | Qin ................. H04M 3/436 |
| 2017/0134574 A1 | 5/2017 | Winkler |

OTHER PUBLICATIONS

Google Play; Truecaller: Caller ID, SMS spam blocking & Dialer; retrieved from the Internet Nov. 13, 2017; https://play.google.com/store/apps/details?id=com.truecaller&referrer=utm_source%3Dtcweb; 2 pages.

Friedman, Jack P.; List of IBM Patents or Patent Applications Treated as Related; Dec. 2017; 1 page.

\* cited by examiner

IDENTIFYING AND CONTROLLING UNWANTED CALLS

CROSS REFERENCE TO RELATED APPLICATIONS

This application is a continuation application claiming priority to Ser. No. 15/813,565 filed Nov. 15, 2017, the contents of which are hereby incorporated by reference.

TECHNICAL FIELD

The present disclosure relates generally to systems, methods and tools for controlling and prioritizing the receipt telephone calls.

BACKGROUND

Today, many businesses use telemarketing techniques to contact and relay product information to potential clientele. Telemarketing techniques can include contacting potential sales leads, conducting market research, and promoting various products. Known telemarketing techniques include telephone calls from operators in a call center; emails; and text messages. Typically, businesses obtain calling lists from a variety of sources. Unfortunately, it is difficult to predict which consumers will be receptive to a telemarketing call. Even if a consumer is interested in being called regarding a particular product or subject, there are few mechanisms available which forward this interest to the appropriate business. Consequently, businesses are often forced to call a large number of consumers in order to eventually find an interested consumer. Thus, many telemarketing calls are unwanted and unsuccessful.

Telemarketing has become unpopular with many consumers, often due to the volume of unwanted calls individuals may receive. Some consumers try to filter the unwanted calls using caller-id services which identify the phone number of a caller before the individual answers the phone. Unfortunately, a caller can have its identity blocked from caller-id services. This forces the consumer to answer a call without knowing if the call is a telemarketing call or a call from a friend, family or acquaintance. Thus, despite known mechanisms, i.e., "do-not call" lists and caller-id, consumers may still receive unwanted calls.

SUMMARY

An embodiment of the present disclosure provides a method for identifying and controlling unwanted telephone calls comprising the steps of comparing, by a processor, a phone number of an incoming call with a contact list; determining, by the processor, that the phone number is not an entry in the contact list; querying, by the processor, a shared table comprising a list of one or more unique phone numbers having a previous call duration and previous sentiment of a user during a previous incoming call for the phone number of the incoming call; analyzing, by the processor, the shared table for the previous call duration and the previous sentiment of the user during the previous incoming call for the phone number of the incoming call; and rejecting, by the processor, the incoming call as a function of the previous call duration being less than a predetermined call duration and the previous sentiment being a negative sentiment.

DETAILED DESCRIPTION

Overview

Figure 1:
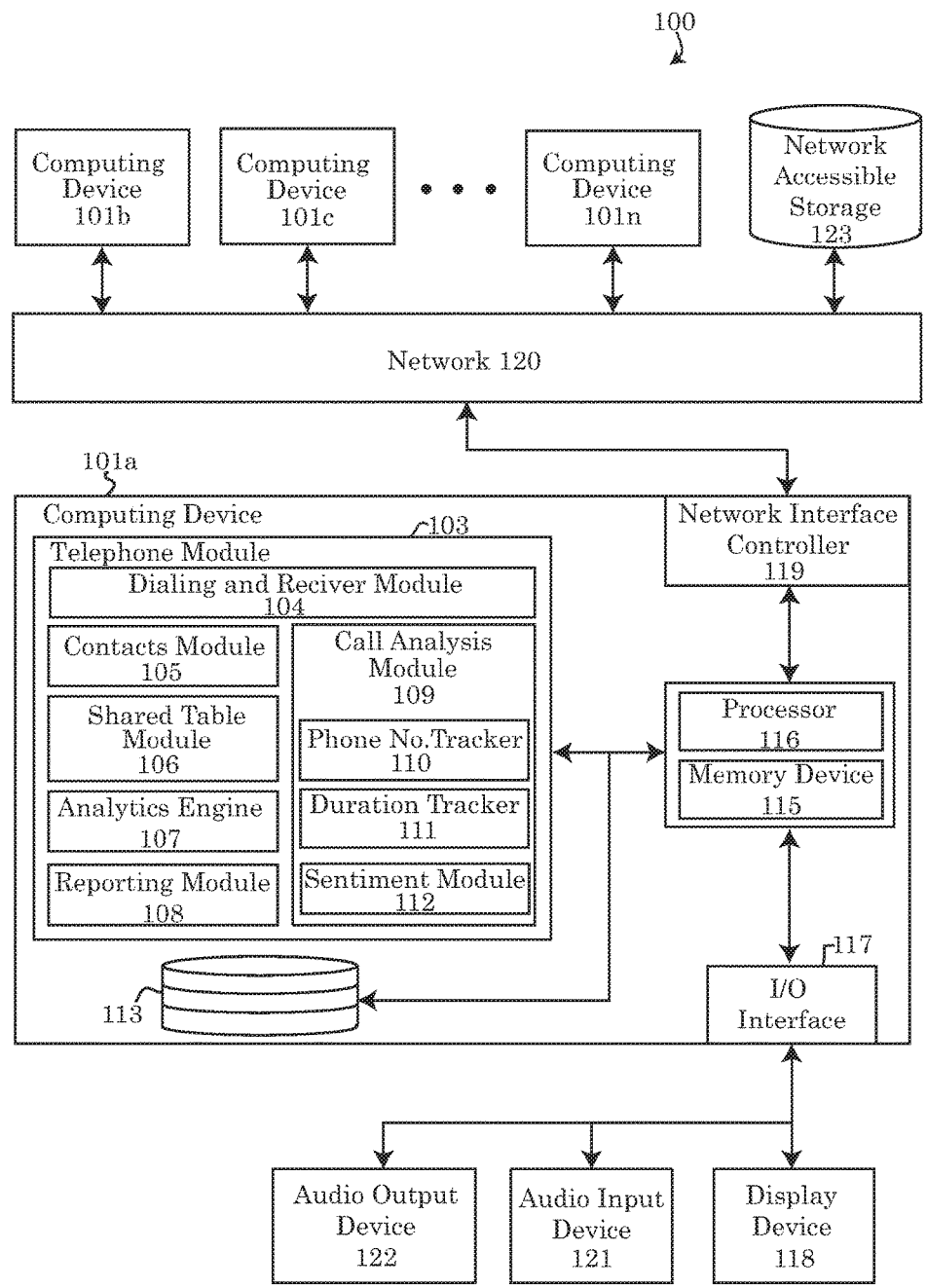
FIG. 1 depicts a schematic view of an embodiment of a system for identifying and controlling unwanted telephone calls consistent with the embodiments of the present disclosure.

Currently available systems, methods and tools for screening or ignoring telephone calls are not currently adequate or sufficiently efficient for bypassing unwanted callers. The available methods rely on mechanisms such as caller ID, do not call lists and do not disturb modes available on a user's telephone system. These mechanisms have faults that can be circumvented by telemarketers and can also result in missing calls that are actually wanted by the user (in the case of the do not disturb features). Thus there is a need for improved systems, methods and tools that can accurately filter out unwanted callers, while still allowing desired calls to be transmitted to a user's telephone system.

Embodiments of the present disclosure leverage the use of computer networks, data sharing, data analytics and sentiment analysis to identify and control unwanted telephone calls from disturbing a user. Embodiments of telephones and telephone enabled device, may periodically receive incoming calls from one or more telephone or telephone-enabled devices transmitting the incoming call. A telephone and/or telephone-enabled device (hereinafter referring to both telephones and telephone-enabled devices as a "telephone") may be any standard telephone or computing device capable of transmitting or receiving telephone calls over a telephone network or a computer network. Examples of telephones may include cellular telephones, smart phones, mobile computing devices, tablet computers, laptops, network-enabled watches, network enabled glasses and network enabled media devices. Embodiments of the types of telephone networks that may utilize the embodiments of the present disclosure may include cellular networks, plain old telephone service (POTS), integrated services digital network (ISDN), Voice over IP (VoIP), fiber-optic networks, public switched telephone networks (PSTN) and/or any other known communication network capable of transmitting voice data.

Embodiments of the present disclosure may use both a contacts list and/or a shared table of unique calls to identify and control the callers that are able to directly reach the telephones of the users utilizing the disclosed system, method and tools. Embodiments may utilize the contact lists and/or a shared table of unique calls (hereinafter may be referred to as a "shared table") in order to identify incoming calls that may be directed to the user or filtered out based on whether the incoming call's number is in the user's contact list and/or based on the past experiences of the individual initiating the incoming caller. Embodiments of contacts lists and/or the shared table may be locally stored in a storage device of the telephone or accessible remotely over a computer network using a network location or shared location that may stream the data of the contact list or shared tabled to each telephone provided permissions to access the data. The contact lists and the shared table may be utilized by a single user in some instances or shared amongst a group of users, each having a telephone capable of periodically accessing and updating the contact list and/or shared table. For example, a contacts list and/or shared table may belong to a group comprising family, friends, colleagues, etc. Each member of the group may share, amend and update the contacts list and/or shared table after receiving a unique call or may periodically add new numbers to the contact list or shared table.

In some embodiments, when an incoming call is being received by the user's telephone, the telephone may compare the incoming call's phone number with the telephone numbers listed in the contacts list and the shared table. The telephone may identify the phone number as being part of the contacts list and/or the shared table. In the instance where the phone number is registered in the contacts list, the disclosed system may allow the incoming call to ring the user's telephone because the phone numbers in the contact list may be considered desirable phone numbers of known individuals (thus specifically added by group members and users to the contact list).

However, if the telephone number of the incoming call is not part of the contacts list, but is registered to the shared table, the telephone may query the shared table for information that may give insight into the past experience of each user that has received a call from the incoming number. For example, the shared table may store information regarding the duration of the previous incoming call and the sentiment of the user who engaged the incoming caller during one or more previous incoming calls. If the call duration is particularly short (less than a pre-programmed or pre-determined length of time) and the sentiment of the user is negative, the system may interpret the information provided by the shared table as most likely an unwanted call and preform one or more actions set by the user. Examples of the action set by the user may include rejecting and/or blocking the call in some embodiments. In alternative embodiments, the action performed by the disclosed system may include transmitting a text message over a short message service (SMS) to the phone number of the incoming call instructing the caller to contact the user in a different manner, for example via text message or email. Likewise, if the previous incoming call from the number currently incoming was previously determined to have a positive sentiment or a longer call duration, the currently incoming call may be sent to the recipient's telephone where the user may decide to answer the call or not.

In some instances, a unique phone call may be incoming to a user's telephone. A unique phone call may refer to an incoming telephone call having a phone number that has not yet been registered to the shared table or a user's contact list. Under circumstances where a unique call is being received, the incoming call may be received by a telephone and/or managed by a shared table module which may be part of said telephone The disclosed systems may monitor the incoming telephone call for both duration and the sentiment of the user during the call and update the shared table via the shared table module. Upon the conclusion of the telephone call, an entry may be created in the shared table by the shared table module which may include information collected during telephone call, including call duration and the sentiment of the user. Subsequent incoming calls from the previously unique numbers entered into the shared table may be queried and compared against the data entered into the shared table to determine whether or not to allow the call to be received by the user or not.

System for Identifying and Controlling Unwanted Telephone Calls

Although certain embodiments are shown and described in detail, it should be understood that various changes and modifications may be made without departing from the scope of the appended claims. The scope of the present disclosure will in no way be limited to the number of constituting components, the materials thereof, the shapes thereof, the relative arrangement thereof, etc., and are disclosed simply as an example of embodiments of the present disclosure. A more complete understanding of the present embodiments and advantages thereof may be acquired by referring to the following description taken in conjunction with the accompanying drawings, in which like reference numbers indicate like features.

As a preface to the detailed description, it should be noted that, as used in this specification and the appended claims, the singular forms "a", "an" and "the" include plural referents, unless the context clearly dictates otherwise.

Figure 2:
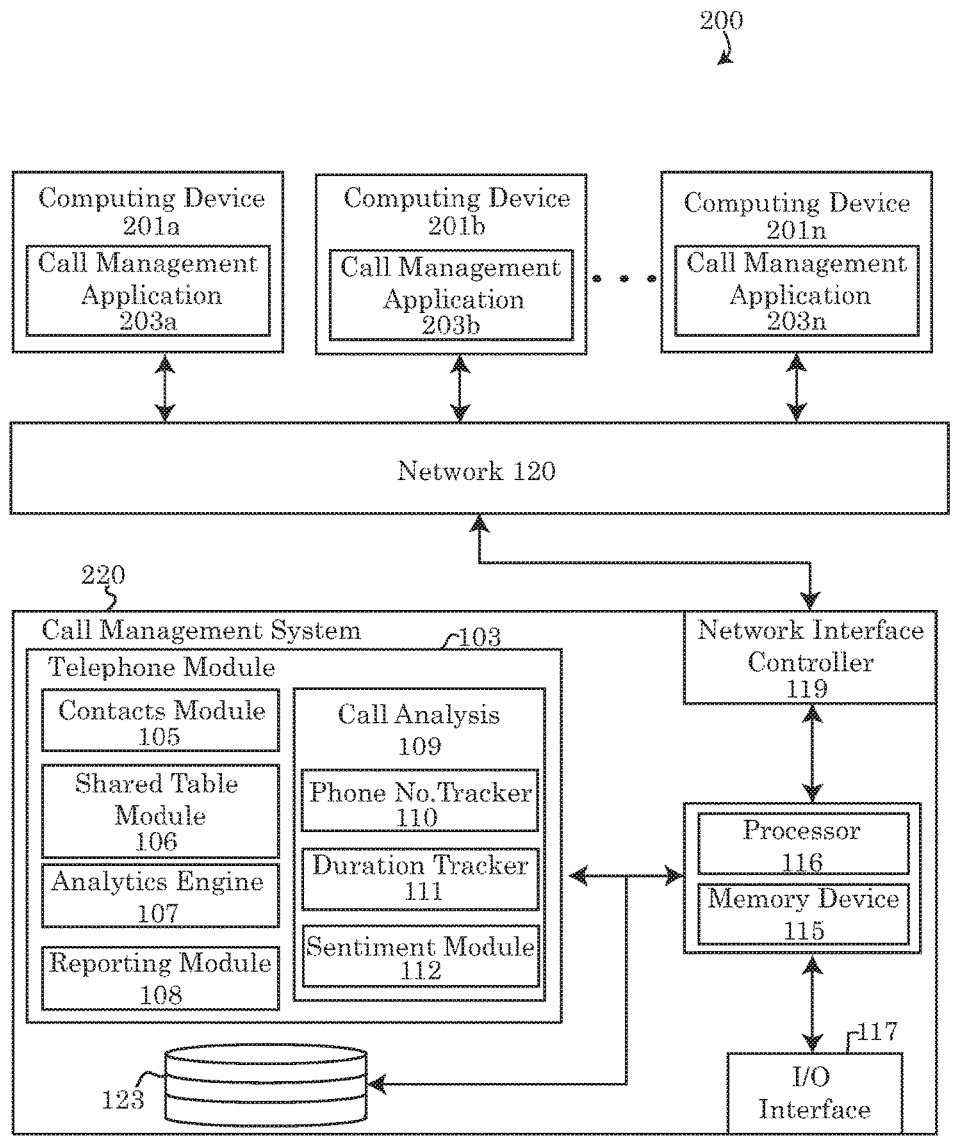
FIG. 2 depicts a schematic view of an alternative embodiment of a system for identifying and controlling unwanted telephone calls using a server side call management system consistent with the embodiments of the present disclosure.

Referring to the drawings, FIGS. 1-2 depicts a block diagram of a calling system 100, 200 capable of identifying and controlling unwanted telephone calls directed to one or more of the computing devices 101*a*, 101*b*, 101*c* . . . 101*n*, 201*a*, 201*b* . . . 201*n* operating as a telephone connected to the calling system 100, wherein each of the computing devices 101*a*, 101*b*, 101*c* . . . 101*n* (collectively referred to as "computing devices 101") and computing devices 201*a*, 201*b* . . . 201*n* (collectively referred to as "computing devices 201") each have telephone-enabled hardware or software allowing the computing devices 101, 201 to send and/or receive telephone calls. Embodiments of the computing devices 101, 201 may each comprise specialized configuration of hardware, software or a combination thereof as depicted in FIGS. 1-4 and as described throughout this application. Embodiments of the computing devices 101, 201 may further comprise one or more elements of a generic computer system 600 of FIG. 6, described in detail below. The elements of the generic computer system 600 may be integrated into each of the computing devices 101, 201 described herein.

Embodiments of the calling system 100 may include a plurality of one or more computing devices 101, 201, call management systems 220 and network accessible storage 123 which may, in some embodiments be hosted by one or more computer systems or servers such as the call management system 220. The number of computing devices 101, 201 network accessible storage 123 devices or call management systems 220 may not be limited to the number of devices and systems specifically depicted in the drawings. The number of computing devices 101, 201 the call management systems 220 and the network accessible storage 123 may be any number of devices and/or systems that may be supported by network 120.

Figure 6:
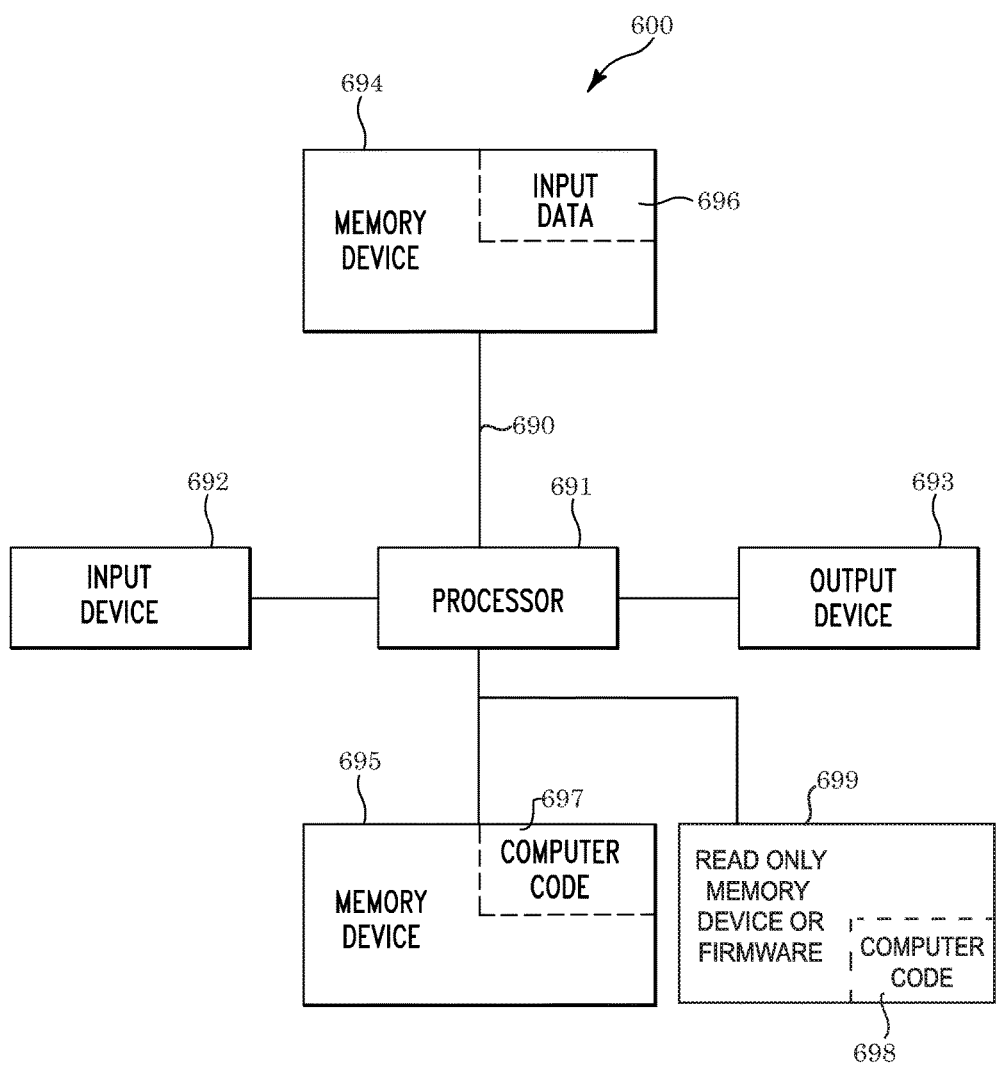
FIG. 6 depicts an embodiment of a computing system consistent with the computer systems of the present disclosure.

Each of the computing devices 101, 201, the network accessible hardware (such as network repository 123) and the call management system 220 connected to the network 120 of the call system 100 may each be referred to as specialized computer systems comprising specialized configurations of hardware, software or a combination thereof as depicted in FIGS. 1-4 of the present disclosure and in the embodiments described herein. Embodiments of each of the computing devices 101, 201, call management system 220 and network accessible storage connected to the call system 100 may not only comprise the elements of the systems and devices depicted in FIG. 1-4, but may also incorporate one or more elements of a generic computer system 600 as shown in FIG. 6 and as described in the COMPUTER SYSTEM section detailed below. One or more elements of the generic computer system 600 of FIG. 6 may be integrated into the specialized computer systems of the computing devices 101, 201, call management system 220 or the network accessible storage 123.

Each of the computing devices 101, 201, call management system 220 and network accessible storage 123 may be connected and placed in communication with one another over the computer network 120. Embodiments of the network 120 may be constructed using wired or wireless connections between each of the hardware devices connected to the network 120. As shown in the exemplary embodiments, each of the computing devices 101, 201 and call management system 220 may connect to the network 120 and communicate over the network 120 using a network interface controller (NIC) 119 or other network communication hardware. Embodiments of the NIC 119 may implement specialized electronic circuitry allowing for communication using a specific physical layer and a data link layer standard. For example Ethernet, Fiber channel, Wi-Fi or Token Ring.

The NIC 119 may allow for a full network protocol stack, enabling communication over network 120 to the group of computing devices 101, 201, call management system 220 or other computing hardware devices linked together through communication channels. Embodiments of the network 120 may facilitate communication and resource sharing among the computing devices 101, 201, call management system 220 and the additional hardware devices connected to the network 120, for example a network accessible storage 123. Examples of network 120 may a local area network (LAN), home area network (HAN), wide area network (WAN), back bone networks (BBN), peer to peer networks (P2P), campus networks, enterprise networks, the Internet, cloud computing networks, cellular networks, plain old telephone service (POTS), integrated services digital network (ISDN), Voice over IP (VoIP), fiber-optic networks, public switched telephone networks (PSTN) and any other network known by a person skilled in the art.

In some embodiments, the network 120 may be a cloud computing environment 50. Cloud computing is a model of service delivery enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models. The characteristics of the cloud computing model may be described as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms operating on one or more computing devices 101a, 101b, 101c . . . 101n (e.g., mobile phones, laptops, PDAs, desktop computers, and computer systems integrated into consumer goods such as automobiles).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

The service models under a cloud computing environment may be described as follows:

Software as a Service (SaaS): the capability provided to the consumer is to use the provider's applications running on a cloud infrastructure. The applications are accessible from various computing devices 101a, 101b, 101c . . . 101bn through a thin client interface such as a web browser (e.g., web-based e-mail), a network accessible program or application. The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

The deployment models of cloud computing environments may be described as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment may be service oriented with a focus on statelessness, low coupling, modularity, and semantic interoperability. At the heart of cloud computing is an infrastructure that includes a network of interconnected nodes 10.

Figure 3:
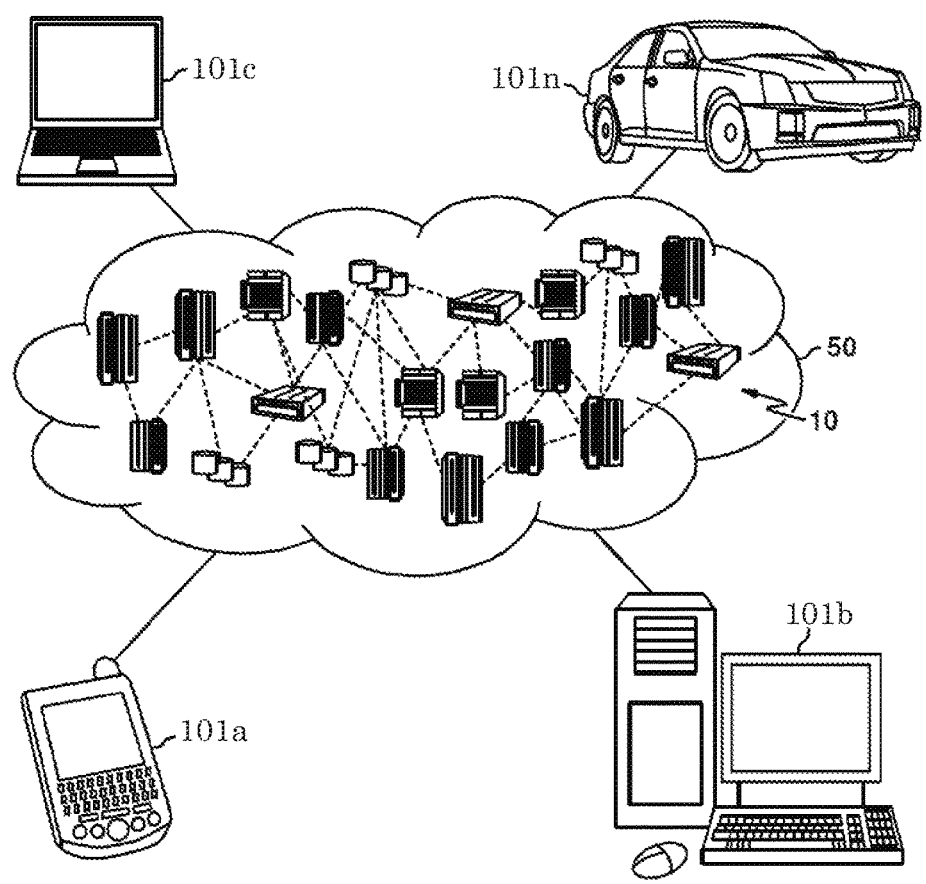
FIG. 3 illustrates a schematic view of an embodiment of a system for identifying and controlling unwanted telephone calls operating in a cloud computing environment.

Referring to the drawings, FIG. 3 is illustrative of a network 120 operating as a cloud computing environment 50. As shown, the cloud computing environment may include one or more cloud computing nodes 10 with which client computing devices used by cloud consumers, such as, for example, desktop computers 101*b*, laptop computers 101*c*, mobile communication devices 101*a*, tablet computers or computer systems integrated into consumer goods 101*n*, as exemplified by the vehicle shown in FIG. 3.

Computer system nodes 10 may communicate with one another and may be grouped (not shown) physically or virtually, in one or more networks, such as Private, Community, Public, or Hybrid clouds as described hereinabove, or a combination thereof, allowing for the cloud computing environment 50 to offer infrastructure, platforms and/or software as services for which a cloud consumer does not need to maintain resources on each computing device 101 but rather may be accessible via a computing device 201 accessing a call management system 220 remotely over the network 120 of the cloud environment 50. It is understood that the types of computing devices 101, 201 as shown in FIG. 1-2 are intended to be illustrative only and that nodes 10 of a cloud computing environment 50 may communicate with any type of computerized device over any type of network and/or network addressable connection (e.g., using a web browser).

Figure 4:
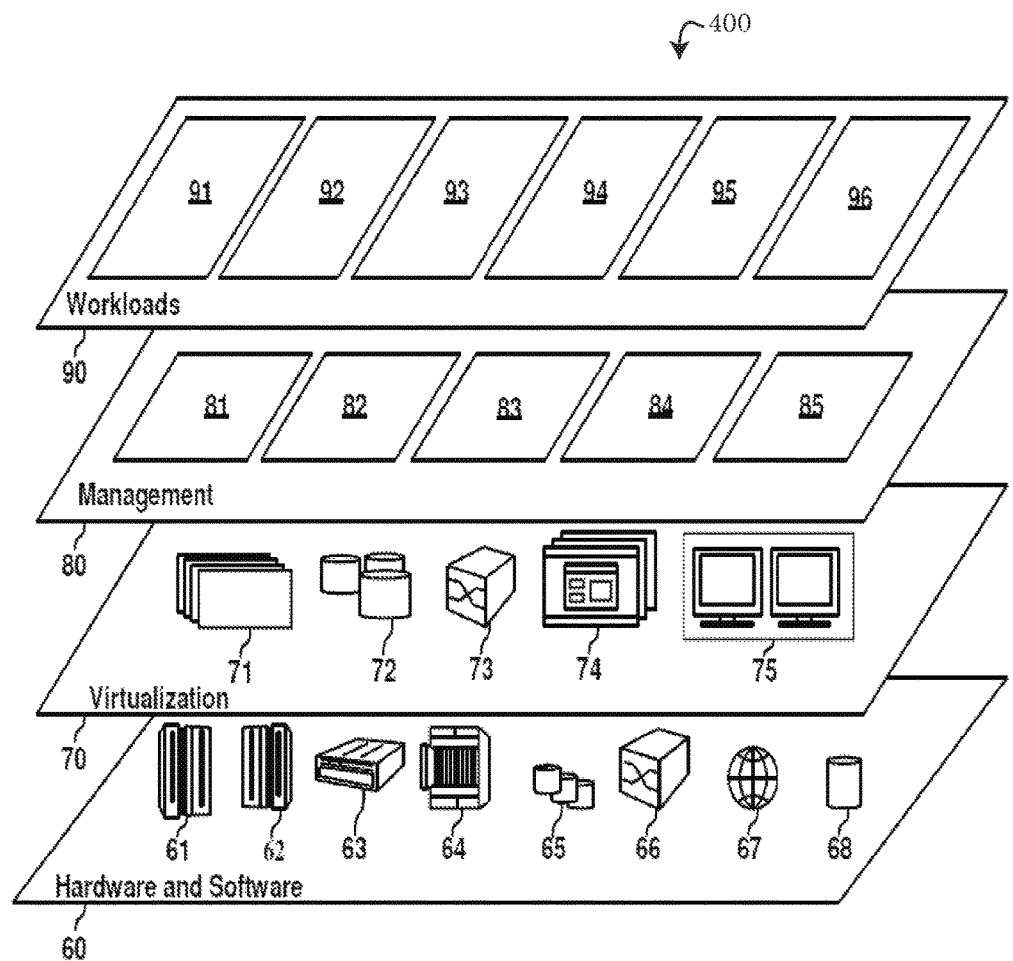
FIG. 4 illustrates a schematic view of an embodiment of the abstraction layers of a cloud computing environment.

Referring now to FIG. 4, a set of functional abstraction layers 400 provided by a cloud computing environment 50 of the network 120 is shown. It should be understood in advance that the individual components and functions of the abstract layers 400 shown in FIG. 4 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networking components 66. In some embodiments, software components may include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

Embodiments of the management layer 80 may provide the functions described below. Resource provisioning 81 provides dynamic procurement of computing resources and other resources that are utilized to perform tasks within the cloud computing environment 50. Metering and Pricing 82 provide cost tracking as resources are utilized within the cloud computing environment 50, and billing or invoicing for consumption of these resources. In one example, these resources may include application software licenses. Security provides identity verification for cloud consumers and tasks, as well as protection for data and other resources. User portal 83 provides access to the cloud computing environment of the network 120 for consumers (i.e. users of the call system 100, 200 via a computing device 101, 201) and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: records management 91; web page management 92; searching and results management 93; data analytics processing 94; profile management 95; and call management 96.

In some embodiments of the call system 100, the call system 100 may include one or more computing devices 101, 201 connected to the network 120 and the network accessible storage 123 as shown in FIG. 1-2. A computing device 101 may be any type of telephone or telephone-enabled device as previously described above. In the exemplary embodiment, the computing device may be a cell phone or smart phone which may be capable of making telephone calls over the cellular network or via the data network (i.e. making a VoIP call). Some additional examples of computing devices 101, 201 may include, but are not limited to laptops, tablet computers, smart watches and glasses, desktop computers, personalized data assistants (PDA) and wireless or internet enabled media devices.

Embodiments of the computing devices 101 of FIG. 1 found in system 100 may include a telephone module 103 as shown in FIG. 1. The telephone module 103 may perform the functions of sending and receiving telephone calls, maintaining a contact list, maintaining a shared table, tracking the incoming call phone numbers, analyzing the duration and sentiment of a user of the computing device 101 during a call, messaging and/or blocking incoming telephone calls as a function of the duration and sentiment of previous calls received by the incoming call's phone number. The telephone module 103 may comprise specialized arrangements of hardware physically connected within the computing device 101, a software program or program instructions loaded in the memory device 115 of the computing device 101 or a separate piece of hardware or software interacting with the computing device 101.

In alternative embodiments, the telephone module 103 may comprise virtualized hardware that may be physically accessible via network 120 or remotely accessible via a program executing program instructions of a call management application 203*a*, 203*b* . . . 203*n* (hereinafter "call management application 203") loaded into a memory device 115 of a computing device 201. For example, the computing device 201 may be accessing a virtualized telephone module 103 through services of the call management application 203 maintained by a call management system 220 operating as part of a cloud computing environment 50.

Embodiments of the computing devices 101, 201 may each include a telephone module 103 or remotely access a telephone module 103. The term "module" may refer to a hardware based module, software based module or a module may be a combination of hardware and software resources. A module (whether hardware, software, or a combination thereof) may be designed to implement or execute one or more particular functions, tasks or routines of the computing devices 101, 201 or call management system 220. Embodiments of hardware based modules may include self-contained components such as chipsets, specialized circuitry and one or more memory devices 115. A software-based module may be part of a program code or linked to program code containing specific programmed instructions loaded in the memory device 115 of the specialized computing devices 101, 201 and call management system 220 of the call system 100, 200. In some embodiments of the call module 103, the call module 103 may include one or more submodules which may each perform one or more individual tasks or functions of the telephone module 103. As shown in FIG. 1, the submodules of the telephone module 103 may include a dialing and receiver module 104, contacts module 105, shared table module 106, analytics engine 107, reporting module 108, and a call analysis module 109 comprising a phone number tracker 110, duration tracker 111 and a sentiment module 112.

Embodiments of the dialing and receiver module 104 may perform telephonic functions or enable telephonic features on the computing device 101. These telephonic functions and features may include sending voice data using an audio input device 121 such as a microphone or receiving voice data via an audio output device 122 such as a speaker. Embodiments of the dialing and receiving module 104 may receive incoming calls and capture data relating to the incoming calls including the incoming telephone number, location and name of the caller (if known) and display the call data on a display device 118 of the computing device 101. The dialing and receiving module 104 may further perform the dialing functions of a telephone, allowing for input of an outgoing call's number by the user, selecting each digit of the outgoing call's number to place a phone call and establishing a connection with a second telephone configured to receive a phone call when said outgoing call's number is dialed.

In some embodiments, upon receiving an incoming call, the dialing and receiver module 104 may be able to communicate with the contacts module 105 and/or the shared table module 106 to perform a query to lookup and search for a matching record of the phone number of an incoming call. In alternative embodiments, the dialing and receiver module 104 may transmit incoming call data to the call analysis module 109 or the analytics engine 107 to determine whether the incoming call number matches a registered contact of the contact list or previously received call stored by the shared table module 106 respectively.

Embodiments of the contacts module 105 may perform the function of saving, storing, updating and formatting the call data for each contact stored by the contacts module 105, allowing for an easy and quick retrieval of contact data when requested by one or more modules described herein. In some embodiments, the contacts module may store the contact data in a storage device that may be integrated into the contacts module 105. In alternative embodiments, the contacts module may store the contact data locally on the computing device 101, for example in a database 113. In yet another alternative embodiment of system 100, the contacts module 105 may remotely transmit, retrieve and access contact data remotely over network 120. For example, the contact module 105 may transmit, receive and update contact data stored remotely on a network accessible storage device 123.

Embodiments of the shared table module 106 may manage each unique call received by a computing device 101 or a group of computing devices 101. The shared table module 106 may perform the function of saving, storing, updating and formatting the call data for each unique incoming call being received by the computing device 101 in a shared table that may be queried by other modules in the telephone module 103 or used to determine one or more actions in response to the receipt of an incoming call. The shared table may being accessed by the shared table module 106 may be created and stored by an individual computing device 101 or may be used and updated by a group of computing devices 101 having access to the shared table. For example, each computing devices 101 in the group of computing devices may access, modify and update the shared table module 106 when a unique call is received, wherein a unique call may refer to an incoming call from a phone number that has not been received by a particular computing device 101 or received by at least one member of the group of computing devices 101.

Embodiments of the shared table module 106 may store and update a shared table locally on the computing device 101 or remotely over the network 120 using network accessible storage 123. Each member of a group accessing the shared table may be able to query and update the shared table as each member of the group receives unique incoming calls. Embodiments of the shared table may include call data relating to the unique call which may help to determine whether or not the incoming call should be directly forwarded to the computing device 101. Embodiments of the shared table may save information about the incoming call including, but not limited to, the incoming call's phone number, a name or business associated with the phone number, location associated with the phone number as well as previous call durations and the sentiment of a user that has interacted with and answered one or more phone calls from the incoming caller.

In some embodiments, the telephone module 103 may further comprise a call analysis module 109. The call analysis module 109 may gather and track each of the incoming phone calls received by the dialing and receiver module 104. Embodiments of the call analysis module 109 may track the incoming call's phone number using a phone number tracker 110. For example, the phone number tracker 110 may query said phone number of the incoming call with the shared table managed by the shared table module 106. As a result of the query, the phone number tracker 110 may identify whether or not the incoming call is a unique phone number that has not yet been received by the computer device 101 or one or more computer devices 101 having group access to the shared table.

The call analysis module 109 may further comprise, in some embodiments, a duration tracker 111. Embodiments of the duration tracker may track the length of time that an incoming call lasts when the incoming call is answered by the user of the computing device 101 receiving the call. The duration tracker 111 may use a timer to track the length of the incoming call in some embodiments. Upon completion of the incoming call, the duration tracker 111 may report the duration to the shared table module 106 which may record the call duration in the shared table for the completed incoming call.

In other embodiments of the call analysis module 109, the call analysis module 109 may be responsible for analyzing the sentiment of the user answering the incoming call based on the verbal cues and vocal patterns of the user of the computing device 101 receiving the incoming call. Sentiment analysis performed by the sentiment module 112 may be a measurement of positive or negative language, in order to evaluate written or spoken language to determine if one or more expressions of a party to the conversation during the incoming calls are favorable, unfavorable or neutral. Sentiment analysis may also identify the degree of positive or negative feelings based on the written or verbal words spoken during the incoming call.

Embodiments of the sentiment module 112 may use natural language processing, text analysis, computational linguistics and/or biometrics to systematically identify, extract, quantify, and study affective states and subjective information. Sentiment analysis may determine the attitude of a speaker with respect to the topic, the overall contextual polarity or emotional reaction of the interaction between the user of the computing device 101 and the individual contacting the computing device 101.

Embodiments of the sentiment module 112 may transcribe the conversation between each of the parties conversing over the computing devices into text. The transcript may be analyzed by the sentiment module 112 for keywords that may describe a user of the computing device's positive or negative emotion during the duration of the incoming call. These keywords may be used to draw conclusion about the user's sentiment using machine learning or other natural language assessment techniques. In some embodiments of the sentiment module 112, the sentiment module 112 may draw conclusions about the user's sentiment using a built in analytics engine 107. However, in the exemplary embodiment of systems 100, 200 the analytics engine 107 may be separate from the sentiment module 112. The analytics engine utilize machine learning and data models to identify the user's sentiment obtained by the sentiment module 112 during the phone call and the duration of the call to predict whether or not the incoming call was a desirable or undesirable phone call to receive. The analytics engine 107 may also determine based on the sentiment and call duration whether or not a subsequent call from the same incoming call number should be sent to the user to decide whether or not to answer the call or if the call should be blocked, rejected or forwarded a separate message such as a short message service (SMS) text message insisting the incoming call's caller text message or email the computing device 101 instead.

In some embodiments, the analytics engine 107 may include program code that utilizes the computing device 101 to perform data analysis on information received and stored by the telephone module 103, including the contacts module 105, shared table module 106 and call analysis module 109, the phone tracker 110, duration tracker 111 and sentiment module 112). A statistical analysis of the data retrieved from each data source (i.e. the shared table and data collected by each submodule 103, 105, 106, 107, 108, 109) may be performed with the purpose of drawing conclusions about the information received by the analytics engine 107. For instance, embodiments of the analytics engine 107 may analyze data to discover meaningful patterns in the data using a simultaneous application of statistics, computer programming and operations research. The analytics engine 107 of the present application may apply analytics models to describe, predict and improve the identification of incoming calls that are considered acceptable to forward to one or more of the computing devices 101 of the system 100, 200 and/or identify incoming calls that should be blocked, rejected or treated differently than calls from a phone number on an acceptable contact list.

Examples of the types of statistical analysis that may be performed by the analytics engine 107 may include predictive modeling, predictive analytics or supervised learning where the computing system is capable of predicting a target (outcome) variable (feature) using records (cases) where the target is known (i.e. previously received incoming calls). Statistical or machine learning models may be "trained" using the known data, then applied to data where the outcome variable is unknown. Embodiments may include both classification (where the outcome is categorical, often binary) and prediction (where the outcome is continuous). Other available methods of statistical analysis that may be used may include data mining, text mining or text analytics, wherein collection of statistical and machine learning methods are used in conjunction with the data sources, including textual parsing cluster analysis, outlier detection and association rules. In some embodiments, the analysis performed may be a business intelligence analysis, which may extract useful information each data source without further statistical analysis or machine learning methods described above.

The information received by the analytics engine 107 may be received from one or more data sources (i.e. each of the modules or sub modules in the telephone module 103). The information provided to the analytics engine 107 may then be subsequently analyzed, stored and/or retained by the analytics engine 107 in one or more databases 113, data warehouses or network accessible storage 123 devices and may be recalled or queried at a later point in time. For example, a dialing and receiver module 104 of a computing device 101 may receive an incoming call. The analytics engine 107 may retrieve the call information from dialing and receiver module 104 and compare the incoming call's number with the contacts list maintained by the contacts module 105. If the incoming call number is not registered to the contacts list, the analytics engine 107 may query the shared table module 106 to determine if the incoming call is unique. If the incoming call is unique, the analytics engine may determine that the call duration and content should be recorded for sentiment analysis by the sentiment module 112 to determine whether or not a subsequent incoming call from the same number at a later date should be answered, blocked, rejected or send a separate notification (i.e. an email or SMS text message). On the other hand, if the incoming call is not unique, the analytics engine 107 may analyze the call duration and sentiment of past incoming calls for the currently incoming call's number and determine as a function of the previous call duration or sentiment whether the incoming call should be displayed to the user of the computing device, blocked, rejected or sent a separate notification (such as an SMS message or email).

Embodiments of the telephone module 103 may further comprise a reporting module 108. The reporting module 108 may include tools or software applications capable of tracking the actions of the telephone module 103 filtering out and controlling unwanted calls and preparing one or more reports based on the actions taken by the telephone module 103 to control unwanted callers. For example, the reporting module 108 may be a dashboard accessible by a user of the system 100, 200 which may display the names and numbers of incoming calls determined to be unwanted, the actions taken by the computing device 101 once an incoming call is determined to be unwanted based on previous duration and sentiment. The reporting module 108 may provide detailed statistics and log events of each incoming call, and allow a user of the computing device to manually alter or change an action taken through the dashboard of the reporting module 108.

Referring to the drawing of FIG. 2, the system 200 may be an alternative embodiment of system 100, wherein instead of a computing device 101, such as a mobile phone or tablet computing device managing the functions of the telephone module 103, a call management system 220 may manage each incoming call remotely over the network 120, determine the actions to be taken as well as update contact lists and shared tables over the network 120. Each computing device 201 may be equipped with a call management application 203a, 203b . . . 203n (referred to collectively as "call management application 203") which may be responsible for allowing the call management system 220 to remotely access and interact with each computing device 203 connected to the call management system 220 without requiring the computing device 201 itself to perform every function of the telephone module 103 (unlike the embodiment of system 100, wherein each client device 101 is equipped with the telephone module 103).

Embodiments of the call management application 203 may be loaded onto each computing device 201 where the user wants the call management system 220 to analyze incoming calls and determine whether or not the incoming call should be forwarded to the computing device 203, blocked, rejected and/or messaged using SMS, email or other electronic methods of communication. The difference between system 100 and system 200 may be that in system 100, the shared table management, contacts list management, call analysis and analytics functions or a combination thereof are handled by individual computing devices 101 locally while being able to access one or more contacts lists and the shared table remotely, whereas in system 200, one or more functions of the telephone module 103 are remotely performed by the call management system 220 for all computing devices 201 in the group having access to a commonly owned shared table.

Method for Identifying and Controlling Unwanted Telephone Calls

Figure 5:
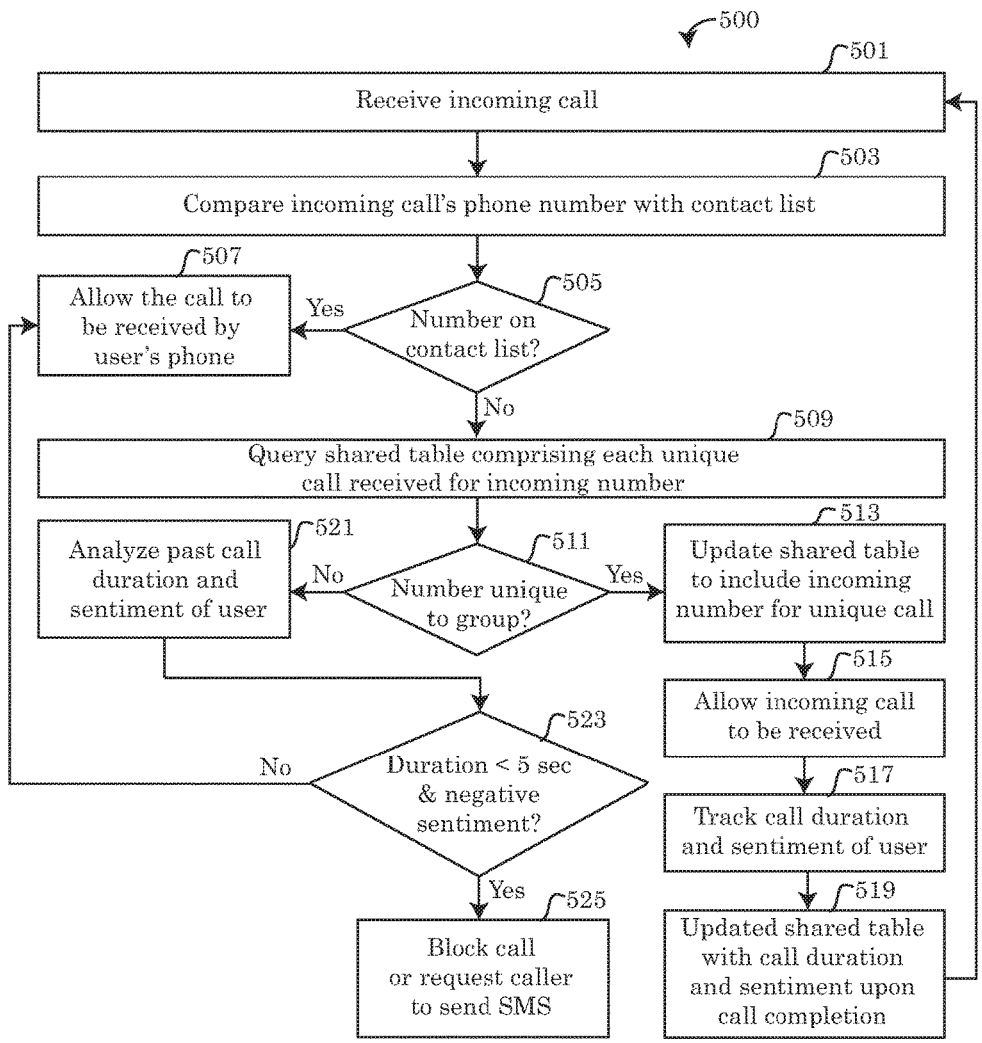
FIG. 5 illustrates an embodiment of an algorithm for identifying and controlling unwanted telephone calls.

The drawing of FIG. 5 represents an embodiment of a method or algorithm 500 that may be implemented for identifying and controlling unwanted telephone calls using system 100, 200 described in FIGS. 1-4, using one or more computer devices as defined generically in FIG. 6 below, and more specifically by the embodiments of the specialized computing devices having telephone enabled features as presented in FIGS. 1-4. A person skilled in the art should recognize that the steps of the algorithm 500 described in FIG. 5 may be performed in a different order than presented by FIG. 5 and the algorithm 500 may not require all the steps described herein to be performed. Rather, some embodiments may identify and control unwanted telephone calls using only one or more of the steps discussed below.

The embodiment of the method 500 for identifying and controlling unwanted telephone calls may begin at step 501. In step 501, the dialing and receiving module 104 of the computing device 101, 201 may receive an incoming call from a telephone which may be operated by a third party user or machine. In stop 503, the computing device 101 may compare the incoming call's phone number with a contact list maintained by the contacts module 105. The computing device may query the contacts module 105 to determine if the incoming call's number has been registered in the contact list.

In step 505, a determination may be made based on the results of the query in step 503. If the contacts module 105 returns a matching phone number stored within the contacts list, the algorithm 500 may proceed to step 507, wherein the computing device 101 allows the incoming call to be received and displayed to the user of the computing device 101. If however, a determination is made in step 505 that the phone number of the incoming call is not on the contact list maintained and updated by the contacts module 105, the algorithm 500 may move to step 509. In step 509 of the algorithm 500, the computing device may query a shared table maintained by the shared table module 106 for the phone number of the incoming call. The shared table may comprise each unique number that has been received by the computing device 101 or one or more of the computing devices 101 in a group that may collectively have permissions for accessing and updating the shared table.

Based on the query results performed in step 509, in step 511, the computer device 101 may determine whether or not the incoming call is a unique number that has not yet been registered with the shared table. If it is determined by the computing device 101 that the incoming call is unique because the shared table does not include an entry for the phone number of the incoming call, the shared table module 106 of the computing device 101 may in step 513 update the shared table to include the incoming call's number by creating a new entry in the shared table. Moreover, the algorithm 500 may proceed to step 515, wherein the computing device 101 may allow the incoming call to be received and displayed by the display device 118 of the computing device 101. The user may choose whether or not to answer the call, and upon answering the call, the computing device 101 may, in step 517, track the call duration and analyze the sentiment of the phone call via the call analysis module 109. For example, the sentiment module 112 of the computing device 101 may transcribe the spoken words of the call to text and have the analytics engine 107 analyze the text of the call's transcript for keywords and signals that the sentiment of the user operating the computing device receiving the incoming call was positive or negative. In step 519, the call duration and sentiment identified in step 517 may be updated in entry of the shared table.

Referring back to step 511 wherein a determination is made whether or not the incoming call is a unique number that has not been entered into the shared table, the algorithm 500 may proceed to step 521 if the incoming call's phone number has been previously entered into the shared table and thus not unique. In step 521 of the algorithm 500, the computing device 101 and more specifically the analytics engine 107 may retrieve the stored data for the incoming call's entry into the shared table, including the previous call durations and sentiment associated with the incoming call's number. Based on previous call data having a positive or negative sentiment and the call lasting less than a predetermined length of time (for example less than 5, 10, 15, 20 seconds), the analytics engine 107 may conclude whether or not to allow the call to be received by the computing device 101, 201 or to take a different action. If, in step 523, the call is less than the predetermined length of time and a negative sentiment is identified by the analytics engine 107 as a function of the past calls from the incoming number, the algorithm 500 may proceed to step 525 and take one or more actions. For example, block the call, reject the number or transmit a request via SMS, email or another form of electronic communication to the incoming caller. Conversely, if the previous incoming call's duration was greater than a predetermined length of time and/or comprised a positive sentiment, the incoming call may be received and answered by the user of the computing device 101, 201.

Computer System

Referring to the drawings, FIG. 6 illustrates a block diagram of a computer system 600 that may be included in the systems of FIGS. 1-4 and for implementing methods for identifying and controlling unwanted telephone calls as described in the algorithm of FIG. 5 and in accordance with the embodiments described in the present disclosure. The computer system 600 may generally comprise a processor 691, otherwise referred to as a central processing unit (CPU), an input device 692 coupled to the processor 691, an output device 693 coupled to the processor 691, and memory devices 694 and 695 each coupled to the processor 691. The input device 692, output device 693 and memory devices 694, 695 may each be coupled to the processor 691 via a bus 690. Processor 691 may perform computations and control the functions of computer 600, including executing instructions included in the computer code 697 for tools and programs for identifying and controlling unwanted telephone calls in the manner prescribed by the embodiments of the disclosure using the systems of FIGS. 1-4 wherein the instructions of the computer code 697 may be executed by processor 691 via memory device 695. The computer code 697 may include software or program instructions that may implement one or more algorithms for identifying and controlling unwanted telephone calls, as described in detail above and in FIG. 5. The processor 691 executes the computer code 697. Processor 691 may include a single processing unit, or may be distributed across one or more processing units in one or more locations (e.g., on a client and server).

The memory device 694 may include input data 696. The input data 696 includes any inputs required by the computer code 697, 698. The output device 693 displays output from the computer code 697, 698. Either or both memory devices 694 and 695 may be used as a computer usable storage medium (or program storage device) having a computer readable program embodied therein and/or having other data stored therein, wherein the computer readable program comprises the computer code 697, 698. Generally, a computer program product (or, alternatively, an article of manufacture) of the computer system 600 may comprise said computer usable storage medium (or said program storage device).

Memory devices 694, 695 include any known computer readable storage medium, including those described in detail below. In one embodiment, cache memory elements of memory devices 694, 695 may provide temporary storage of at least some program code (e.g., computer code 697, 698) in order to reduce the number of times code must be retrieved from bulk storage while instructions of the computer code 697, 698 are executed. Moreover, similar to processor 691, memory devices 694, 695 may reside at a single physical location, including one or more types of data storage, or be distributed across a plurality of physical systems in various forms. Further, memory devices 694, 695 can include data distributed across, for example, a local area network (LAN) or a wide area network (WAN). Further, memory devices 694, 695 may include an operating system (not shown) and may include other systems not shown in the figures.

In some embodiments, rather than being stored and accessed from a hard drive, optical disc or other writeable, rewriteable, or removable hardware memory device 694, 695, stored computer program code 698 (e.g., including algorithms) may be stored on a static, non-removable, read-only storage medium such as a Read-Only Memory (ROM) device 699, or may be accessed by processor 691 directly from such a static, non-removable, read-only medium 699. Similarly, in some embodiments, stored computer program code 697 may be stored as computer-readable firmware 699, or may be accessed by processor 691 directly from such firmware 699, rather than from a more dynamic or removable hardware data-storage device 695, such as a hard drive or optical disc.

In some embodiments, the computer system 600 may further be coupled to an input/output (I/O) interface (for example I/O interface 117) and a computer data storage unit (for example a network accessible storage device 123, a data store, data mart or database 113). An I/O interface 117 may include any system for exchanging information to or from an input device 692 or output device 693. The input device 692 may be, inter alia, a keyboard, joystick, trackball, microphone, touchpad, scanning device, bar code reader, mouse, sensors, beacons, RFID tags, microphones, recording device, biometric input device, camera, timer, etc. The output device 693 may be, inter alia, a printer, speaker, a plotter, a display device 114 (such as a computer screen or monitor), a magnetic tape, a removable hard disk, a floppy disk, etc. The memory devices 694 and 695 may be, inter alia, a hard disk, a floppy disk, a magnetic tape, an optical storage such as a compact disc (CD) or a digital video disc (DVD), a dynamic random access memory (DRAM), a read-only memory (ROM) 699, etc. The bus 690 may provide a communication link between each of the components in computer 600, and may include any type of transmission link, including electrical, optical, wireless, etc.

The I/O interface 117 may allow computer system 600 to store information (e.g., data or program instructions such as program code 697, 698) on and retrieve the information from a computer data storage unit (not shown). Computer data storage units include any known computer-readable storage medium, which is described below. In one embodiment, computer data storage unit may be a non-volatile data storage device, such as a magnetic disk drive (i.e., hard disk drive) or an optical disc drive (e.g., a CD-ROM drive which receives a CD-ROM disk).

As will be appreciated by one skilled in the art, in a first embodiment, the present invention may be a method; in a second embodiment, the present invention may be a system; and in a third embodiment, the present invention may be a computer program product. Any of the components of the embodiments of the present invention can be deployed, managed, serviced, etc. by a service provider able to deploy or integrate computing infrastructure with respect to prioritizing geofence retrieval and deletion. Thus, an embodiment of the present invention discloses a process for supporting computer infrastructure, where the process includes providing at least one support service for at least one of integrating, hosting, maintaining and deploying computer-readable code (e.g., program code 697, 698) in a computer system (e.g., computer 600) including one or more processor(s) 691, wherein the processor(s) carry out instructions contained in the computer code 697 causing the computer system to identify and control unwanted telephone calls. Another embodiment discloses a process for supporting computer infrastructure, where the process includes integrating computer-readable program code into a computer system including a processor.

The step of integrating includes storing the program code in a computer-readable storage device of the computer system through use of the processor. The program code, upon being executed by the processor, implements a method for identifying and controlling unwanted telephone calls. Thus the present invention discloses a process for supporting, deploying and/or integrating computer infrastructure, integrating, hosting, maintaining, and deploying computer-readable code into the computer system 600, wherein the code in combination with the computer system 600 is capable of implementing methods for identifying and controlling unwanted telephone calls.

A computer program product of the present invention comprises one or more computer readable hardware storage devices having computer readable program code stored therein, said program code containing instructions executable by one or more processors of a computer system to implement the methods of the present invention.

A computer program product of the present invention comprises one or more computer readable hardware storage devices having computer readable program code stored therein, said program code containing instructions executable by one or more processors of a computer system to implement the methods of the present invention.

A computer system of the present invention comprises one or more processors, one or more memories, and one or more computer readable hardware storage devices, said one or more hardware storage devices containing program code executable by the one or more processors via the one or more memories to implement the methods of the present invention.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for controlling unwanted phone calls, said method comprising:
    comparing, by one or more processors of a computer system, a phone number of a current incoming call to a user of a plurality of users with a contact list comprising respective phone numbers of the user's contacts, said current incoming call being a phone call, wherein the computer system identifies and controls the unwanted phone calls for the plurality of users;
    determining, by the one or more processors, that the phone number of the current incoming call is not a phone number in the contact list;
    in response to said determining that the phone number of the current incoming call is not a phone number in the contact list, querying, by the one or more processors, a shared table comprising a phone list of one or more unique phone numbers of callers having transmitted calls to phones of the plurality of users utilizing the computer system, said phone list in the shared table including a previous call duration and previous sentiment of the plurality of users during previous incoming calls from the callers to the plurality of users for the phone numbers of the previous incoming calls, said previous incoming calls being phone calls;
    in response to determining that the phone number of the current incoming call is a phone number in the phone list of the shared table, analyzing, by the one or more processors, the shared table for the previous call duration and the previous sentiment of the user during a previous incoming phone call for the phone number of the current incoming call to the user;
    ascertaining, by the one or more processors from said analyzing the shared table, that the previous call duration is less than a predetermined call duration and the previous sentiment is a negative sentiment;
    in response to said ascertaining that the previous call duration is less than the predetermined call duration and the previous sentiment is the negative sentiment, rejecting, by the one or more processors, the current incoming call;
    recording, by the one or more processors, audio input and audio output during each previous incoming call;
    converting, by the one or more processors, the recorded audio input and audio output to text; and
    implementing, by the one or more processors, sentiment analysis of the text to identify a positive or negative sentiment of the user receiving the previous incoming call.

2. The method of claim 1, wherein the shared table is remotely accessible to the plurality of users over a network and configured to be updated by the plurality of users as each computing device operated by each user of the plurality of users receives a unique incoming phone call.

3. The method of claim 1, wherein said rejecting the current incoming call comprises:
    transmitting a short message service (SMS) text message request to a computing device transmitting the current incoming call.

4. The method of claim 1, wherein said rejecting the current incoming call comprises:
    blocking the phone number of the current incoming call.

5. The method of claim 1, wherein the predetermined call duration is less than five seconds.

6. The method of claim 1, further comprising providing at least one support service for at least one of creating, integrating, hosting, maintaining, and deploying computer-readable program code in the computer system, where the computer-readable program code in combination with the computer system is configured to implement said comparing, said determining, said querying, said analyzing, said ascertaining, and said rejecting.

* * * * *